United States Patent [19]

Kline

[11] 4,010,325
[45] Mar. 1, 1977

[54] FRAMING CIRCUIT FOR DIGITAL SIGNALS USING EVENLY SPACED ALTERNATING FRAMING BITS

[75] Inventor: Ralph LeRoy Kline, Los Altos, Calif.

[73] Assignee: GTE Automatic Electric Laboratories Incorporated, Northlake, Ill.

[22] Filed: Oct. 30, 1975

[21] Appl. No.: 627,323

[52] U.S. Cl. .................... 179/15 BS; 179/15 AF
[51] Int. Cl.$^2$ ................................ H04J 3/06
[58] Field of Search ...... 179/15 BS, 15 AF, 15 BY, 179/15 BV; 178/69.5 R

[56] References Cited

UNITED STATES PATENTS

| | | | |
|---|---|---|---|
| 3,557,314 | 1/1971 | Avignon | 179/15 BS |
| 3,770,897 | 11/1973 | Haussmann | 179/15 BS |
| 3,903,371 | 9/1975 | Colton | 179/15 BS |
| 3,909,541 | 9/1975 | Bobilin | 179/15 BS |

*Primary Examiner*—Kathleen H. Claffy
*Assistant Examiner*—Joseph A. Popek
*Attorney, Agent, or Firm*—Leonard R. Cool; Russell A. Cannon; David W. Heid

[57] ABSTRACT

In a digital multiplexer which employs pulse stuffing and a plurality of signaling bits including evenly spaced framing bits, a framing circuit consists essentially of a pair of flip-flops which store the last values of a winking framing signal or the error signal which may have occurred during the framing time slots. Outputs of the flip-flops are connected to gating circuits. One said gate produces an output signal when an error occurs. This error signal is applied to an error density detector. When an out-of-frame condition occurs, i.e., the receiving circuit is considered not to be synchronized with the transmitting circuit, the error density detector output which is applied to a clock pulse generator causes an extended count to occur for each error occurrence. This offsets the bit stream by one time slot for each error following the out-of-frame condition, and this extended count follows the extended count due to the presence of a signaling bit. A control bit generator operates under the control of the reconstructed clock signal, the clock pulse generator, the sample counter, and the framing circuit. When the out-of-frame condition causes an extended count, the control bit generator does not advance. However, the error is cleared by the end of the first time slot following the second extended count. If the winking framing signal is "in frame", the extra count is inhibited. The framing and/or reframing process is accomplished more readily by means of a preview circuit which consists of an additional flip-flop and two additional gates. The flip-flop stores the last value of the bit following the control bit. If the winking framing signal is out of frame and an error occurs, the counters in the control bit clock generator are shifted such that the bit in the additional flip-flop is now the previous framing bit. Thus, the next framing bit must be the opposite to be correct. The additional gates are used to reset or preset the control bit generator so that a predetermined framing bit will be made available to compare with the incoming framing signal.

9 Claims, 6 Drawing Figures

FRAMING CIRCUIT FOR DIGITAL SIGNALS USING EVENLY SPACED ALTERNATING FRAMING BITS

BACKGROUND OF THE INVENTION

1. Field of the Invention

This invention relates to communications systems employing time-division techniques and more particularly to a framing and reframing arrangement for use in the maintenance of synchronization between the two ends of such systems.

2. Description of the Prior Art

In prior-art transmission systems, and in particular pulse-code modulation systems such as are quite commonly used in exchange trunk transmission, recovery of the original information requires that the receiving terminal provide a clock signal which has the same frequency and phase as that of the transmitter. In order to accomplish this result, the basic clock frequency is often recovered from the data stream in order to derive a frequency which is the same as that used in generating the original bit stream. In order to obtain the proper synchronization, the transmitted bit stream includes framing information which in most present-day systems is "winking" signal, i.e., a time slot in each frame is reserved for the framing information which appears in the first frame as a pulse and in the second frame as a zero and then repeats. One technique for the recovery of the winking framing information is disclosed in U.S. Pat. No. 2,527,650 to E. Peterson entitled, "Synchronization of Pulse Transmission Systems". An object of the invention was to cause the receiver timing mechanism to drop back in phase by one pulse position for each two successive frames. Another framing technique is disclosed in U.S. Pat. No. 3,742,139, Michael E. Boehly et al., "Framing System for T-Carrier Telephony". In this system, a group of eight time slots is fed to a store and compared with the corresponding eight time slots two frames later. If there is no framing relationship, the circuit steps to the next successive group of eight time slots and repeats the comparison. In neither of the above referenced patents is the problem of "signaling" bits considered which bits contain information other than the regular framing and synchronizing recovery information such as is incorporated in the winking framing signal.

The present invention relates to a multiplexed communication system and more particularly to the receiving timing information which is necessary to properly decode a plurality of time-division multiplexing systems. One prior-art reference in which the recovery of timing information, and in particular reframing, is disclosed is U.S. Pat No. 3,136,861, J. S. Mayo, "PCM Network Synchronization." This subject patent discloses the transmission of "control" pulses in order to indicate the presence or absence of a "stuffed" pulse and, in fact, uses predictive techniques to determine when a control signal should have occurred in the transmitted signal. More particularly, the patent discloses the use of a framing time slot and a variable time slot, the framing time slot being used for the transmission of framing information whereas the variable time slot, which follows the framing time slot, may contain information or it may be a stuffed pulse. With respect to the synchronization recovery and framing circuit it should be noted that that which is disclosed in the subject Peterson patent is that which is used, or its equivalent is used, by Mayo at the receiving terminal. A winking framing pulse is quite commonly used in present-day digital systems. As pointed out by Peterson in U.S. Pat. No. 2,527,650, the use of a framing signal which has a repetition rate of one-half the framing frequency requires that two frames elapse before it can be definitely determined whether the receiver timing is in the correct phase or not. Thus, in the Peterson system, the "slippage" of one time slot only occurs once in two successive frames whenever there is an indication that a framing error has occurred.

In the present invention, a "preview" circuit is employed. This circuit recognizes the state of the bit in the adjacent time slot and uses this to establish the new pattern for the frame comparison circuitry. Thus, the bit stream can be slipped by one time slot each frame and, therefore, the reframing time is reduced.

SUMMARY OF THE INVENTION

In a frame synchronization arrangement for a receiver used in a digital multiplexer system, the basic clock timing is derived from the line bit stream, which includes information bits and signaling bits. The signaling bits include control bits and evenly spaced framing bits.. The control bits identify the location of stuffed pulses. The framing bits are separated and compared with te expected framing bit pattern. When the pattern and the actual framing bits are different, the timing circuitry slips the frame one time slot for each error. To speed up the framing process, a preview arrangement is added which holds the next "framing" digit to be used for comparison and corrects the comparator circuit so that transmisssion of only one additional frame is necessary for an accurate comparison with the previewed framing pattern.

DETAILED DESCRIPTION

Prior Art

A better appreciation of the invention will be obtained by an understanding of the environment in which the invention operates. A good discussion of digital multiplexers is included at chapter 26, pages 608–625, of the text, "Transmission Systems for Communications", Bell Telephone Laboratories, Incorporated, revised 4th edition, December 1971, and is incorporated herein by reference.

Figures 1, 2:
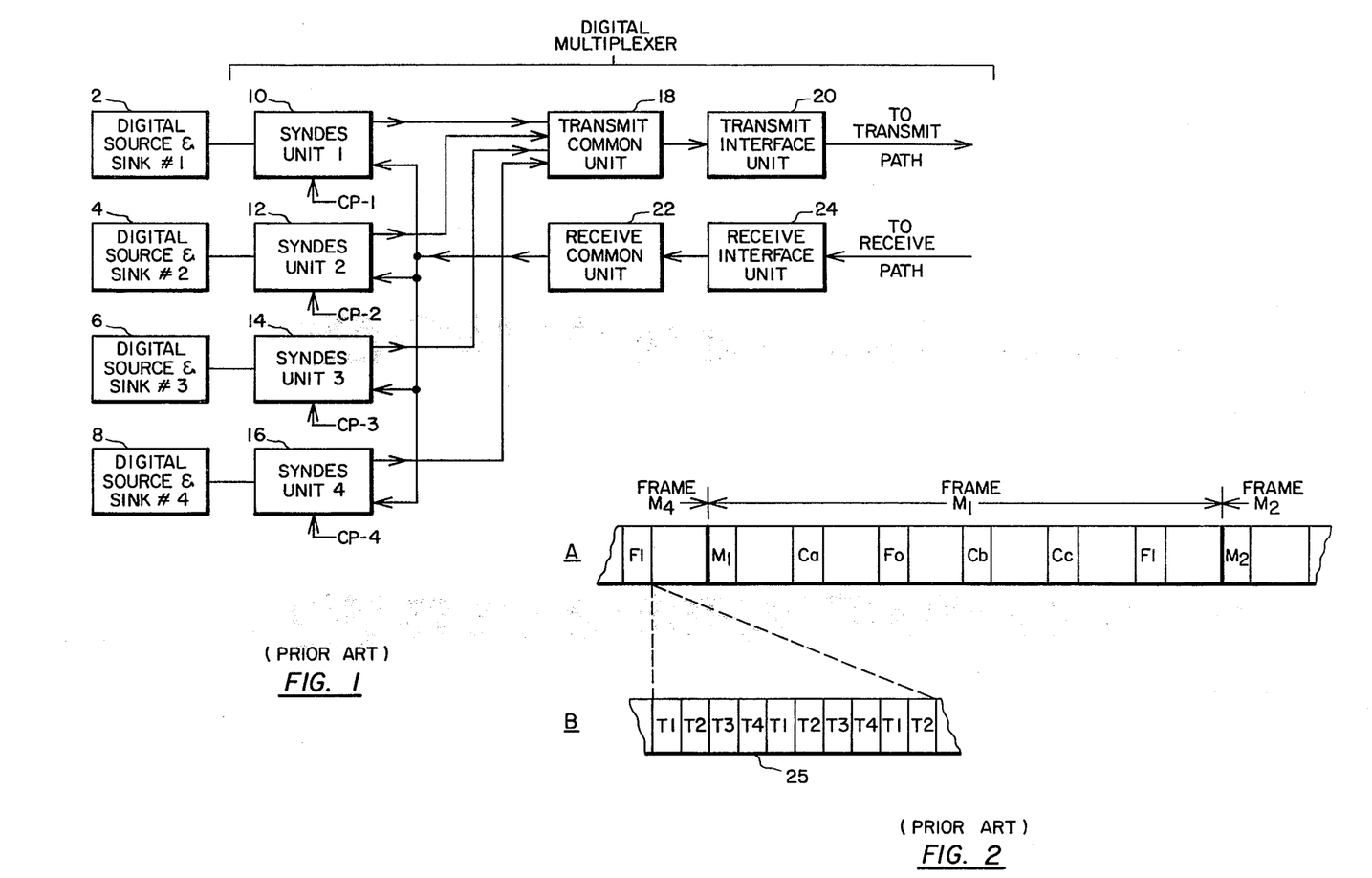
FIG. 1 is a simplified block diagram of a prior-art multiplexer system.
FIG. 2 is a graph of the line signal format for a prior-art multiplexer system which employs the same signal format as is used in the instant invention. Shown at A is the location of the signaling bits in relation to the blocks of information bits. Shown at B is a section of the information portion of the line signal format illustrating the interleaving of information bits within each block.

Referring to FIG. 1, it may be seen that a digital multiplexer accepts several digital signals and combines these to form a single bit stream for transmission. Conversely, the single bit stream from the line is converted into a plurality of separate digital signals at the receiving end. In the normal case, the digital signals from sources 1, 2, 3, and 4 are not synchronized and have a lower bit rate than the line bit rate of the sigle multiplexed bit stream. It is necessary, of course, to have a multiplexer clock rate that is higher than the sum of the bit rates from the digital sources in order that the line rate will contain a sequential, i.e., interleaved, bit from each source. Even where the bit stream from each digital source is the same nominal lower speed bit rate, it has been found desirable to have a multiplexer clock rate which is more than M times, where M = the number of digital sources, the bit rate for the individual bit streams. This permits deviation in individual source repetition rates and allows for phase variations which may occur where the sources are located at widely scattered geographical sites.

Because of the differences in timing between the read-in clock of the lower speed data and the write-out clock at the higher bit rate, an elastic store is commonly used. In such an arrangement, it would be possible that the same bit could be read out twice. One way in which this problem has been overcome is by the use of "pulse stuffing". In effect, a "dummy" pulse is inserted in the bit stream, but before this can occur, control information must be generated for transmission so the receiving equipment can remove the stuffed pulse before the lower rate bit stream passes to the digital sink. The digital multiplexer equipment shown in FIG. 1 performs the desired functions. The number of lower bit rate data sources and sinks may vary, but as shown in FIG. 1 the number used for purposes of illustration is 4. This is the number which is commonly used although more or fewer sources and sinks may be used in this type of multiplexing arrangement. For the transmitter, the synchronizer-desynchronizer units (the acronym is syndes) 10, 12, 14, and 16 each provide the elastic store, the necessary clocking and means for generating the signaling bits that are necessary for control of the stuffed bits. At the output of each syndes unit, a digital signal is available at a synchronized bit rate which may be combined with bit streams from the other sources in transmit common unit 18 to obtain a synchronized interleaved high-speed bit stream for transmission. A commonly used format for such high-speed bit streams, which is derived using four digital sources, is as shown in FIG. 2. The format shows a multiframe sequence in which four frames comprise one multiframe. Signaling bits indicated by M, C, and F are inserted at precise intervals as shown. The information bits which may include stuffed pulses occur between signaling bits and are interleaved as shown in B of FIG. 2. For the particular arrangement shown, but not as a limitation, a total of 12 information bits from each source, i.e., 48 information bits, are included between each pair of signaling bits. Further, it should be noted that when a pulse is to be stuffed, the syndes unit associated with the data source causes the "C" control bits to assume one particular binary state, e.g., a binary "1" in the frame in which the pulse is to be stuffed. The stuffed pulse is then inserted at the first time slot which occurs for the appropriate bit stream following the F1 signaling bit for that frame. For example, if syndes unit 4 is to insert a stuffed pulse in frame 4, then the C signaling bits of that frame would be changed to binary 1 for transmission, and the stuffed pulse would occur at the first T4 pulse following the F1 signaling bit for frame 4. This is illustrated by 25.

To recover the original information bits, the multiplexer clock timing, the clock rate for the original data, and the location of the stuffed pulses must be determined. This is accomplished by the receive common unit 22 and the syndes unit at the receiver. Because the recovery of the timing information is intimately related to the framing synchronization and reframing at the receiver, this will be discussed in more detail below.

GENERAL DESCRIPTION OF THE RECEIVER TIMING CIRCUITRY

Figures 3, 4:
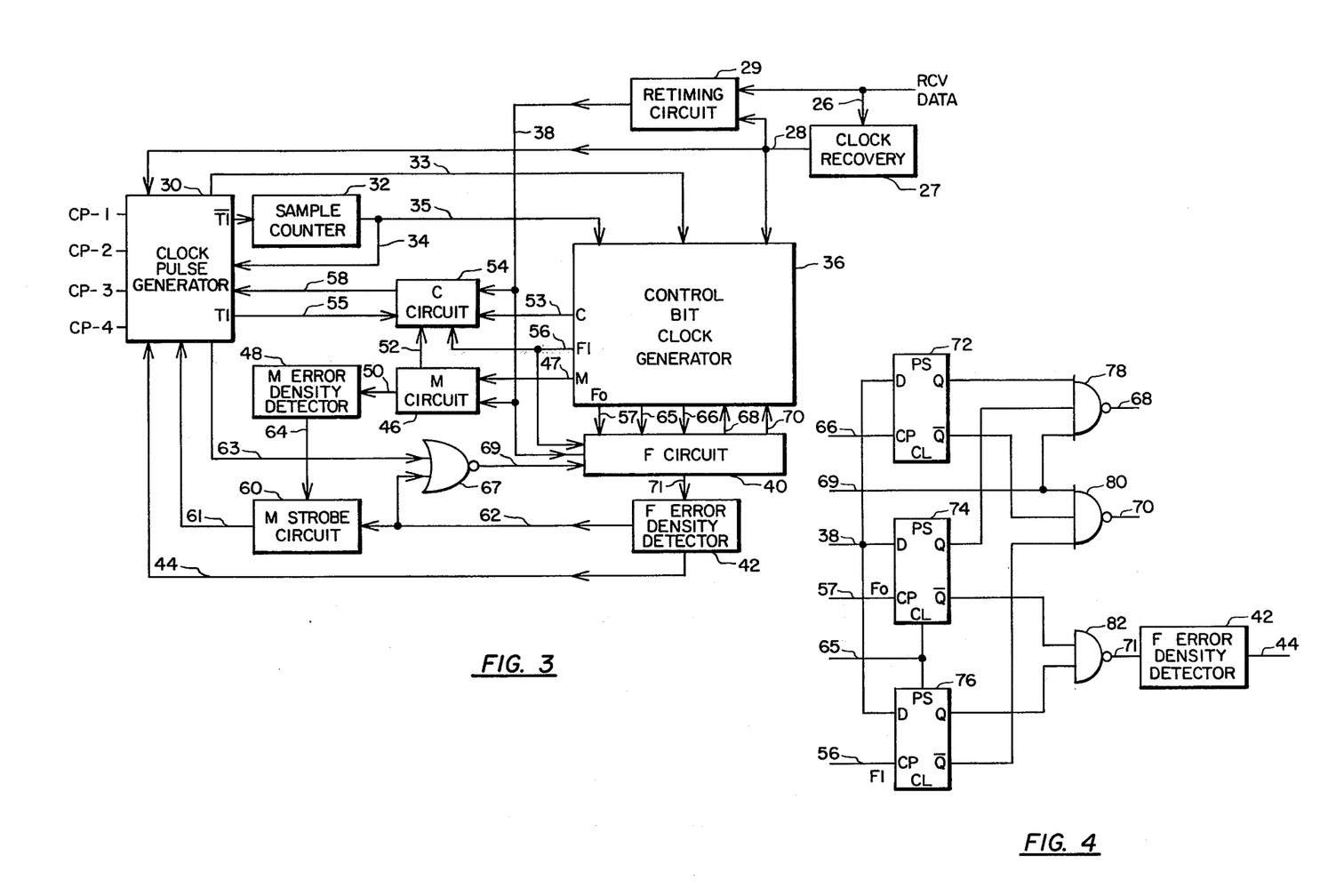
FIG. 3 is a simplified block diagram of a preferred embodiment of the multiplexer receiver timing unit including the preview circuit of the instant invention.
FIG. 4 is a detailed block diagram of the "F" circuit including basic elements of the comparison circuit arrangement and the preview circuit.

Referring now to FIG. 3, it may be seen that the line signal enters via the path entitled RCV Data and is applied to the clock recovery circuit 27 via path 26 and to the retiming circuit 29. The retimed high-speed line signal is applied via path 38 to C circuit 54, "M" circuit 46, and F circuit 40. The clock recovery circuit 27 provides the basic timing for reconstruction of the several multiplexed bit streams. This basic timing information is applied via path 28 to clock pulse generator 30, control bit clock generator 36, and retiming circuit 29.

Clock pulse generator 30 provides the syndes clock timing signals by generating timing pulses T1, T2, T3, and T4 in sequence in a repetitive manner. These timing pulses are combined with the control signals from the C-circuit on path 58 (which inhibit certain of the timing pulses) to produce the CP-1 through CP-4 timing signals. The T1 through T4 timing pulses are inhibited at the signaling bit times and at certain times during reframing; and are inhibited when destuffing or reframing occurs. The circuitry for performing both the timing and inhibiting actions is discussed in more detail later.

Sample counter 32 provides the means for inhibiting the clock pulse generator 30 periodically at the signaling bit times M, Ca, Fo, Cb, Cc, F1. In a preferred embodiment of the invention, sample counter 32 is responsive to the recovered clock timing signal and counts only $1/N^{th}$ of the inverted pulses, e.g., $\overline{T1}$, which is applicable to only one of the multiplexed bit streams. If, as has been discussed above, the block of information bits between signaling bits equals 48, and there are four multiplexed bit streams, sample counter 32 will effectively count 48 clock pulses following which an inhibit signal is applied via lead 34 to the clock pulse generator. This produces an extended count in which the T4 pulse is followed by one clock cycle in which no T pulses (or CP pulses) are produced. Thus, the extended count occurs during the signaling time slot of a received control bit when the frame synchronization is correct.

At this same time, a signal is applied from sample counter 32 to control bit clock generator 36 via path 35. The control bit clock generator 36 generates a pulse during this extra count which is used to produce the local C, F, and M clock signals that are applied to associated circuits via leads 47, 53, 56, and 57. Where the line signal follows the format shown in A of FIG. 2, the sequence will be M, Ca, FO, Cb, Cc, and F1 for each frame.

The F circuit 40 stores the F bits and detects any errors in the winking framing pattern, i.e., 01 01. These errors are sent to the F error density detector 42 which produces an "out-of-frame" condition when the error density reaches a specified level. When F is out-of-frame, each error in an F bit causes an extra extended count in the clock pulse generator 30 through path 44 to shift the alignment of the counters with the data to achieve synchronization. In addition, when such a shift occurs the bit following the erroneous F bit is previewed so that the control bit clock generator 36 can be advanced, if necessary, such that the next F bit sought will be the opposite of the previewed bit (corresponding to the 01 01 . . . pattern). For example, if F0 was found to be a 1 (error) and the next bit was a 1, the lead 68 advances the control bit clock generator such that the next F bit sought will again be F0 (previewed bit corresponds to counter F1). Similarly, if an F1 error occurred and the previewed bit was a "0", a signal on lead 70 would advance the control bit clock generator 36 to F1.

The M circuit 46 stores three of the M bits which are examined once per multiframe (after M3) for a 011 pattern (the fourth M bit is used for remote alarm and is ignored herein). An error pulse is sent to the M error density detector 48 in each multiframe containing an error in the M bit pattern. An out-of-frame condition occurs when a specific level of errors is reached within a predetermined time, and on this occasion an output signal is applied to the M strobe circuit via lead 64.

Even when the framing signal F is in frame, the M strobe circuit 60 samples the condition of the error density detectors periodically. If, when sampled, M is out of frame while F is in frame, a false F0/F1 pattern, to which there corresponds no correct M pattern, has been found, and the error signal resulting therefrom is applied via lead 61 to clock pulse generator 30 causing the clock timing to shift by one bit to begin the search for a new F0/F1 pattern. The C circuit 54 reads in, under control of control bit clock generator 36, the C bits for each frame. When the F1 clock pulse appears on lead 56, the pattern of the C bits is examined to determine if a majority of the C bits in the frame are 1. If they are, a destuff request signal is transmitted to the clock pulse generator 30 via path 58. The M circuit also produces frame pulses K1–K4 which are transmitted to the C circuit via path 52 which designates the multiframe number for the frame currently being received. In the destuffng process, the K pulse of the currently active frame inhibits generation of one specific clock pulse associated with that frame; for example, the K3 pulse inhibits on CP3 pulse. As previously discussed, a stuffed bit to syndes 3 is the third bit following F1 in frame M3. Thus, inhibiting CP3 prevents entry of that bit into syndes 3, and the bit is discarded, i.e., destuffed.

DETAILED OPERATION OF F CIRCUIT

Figure 5:
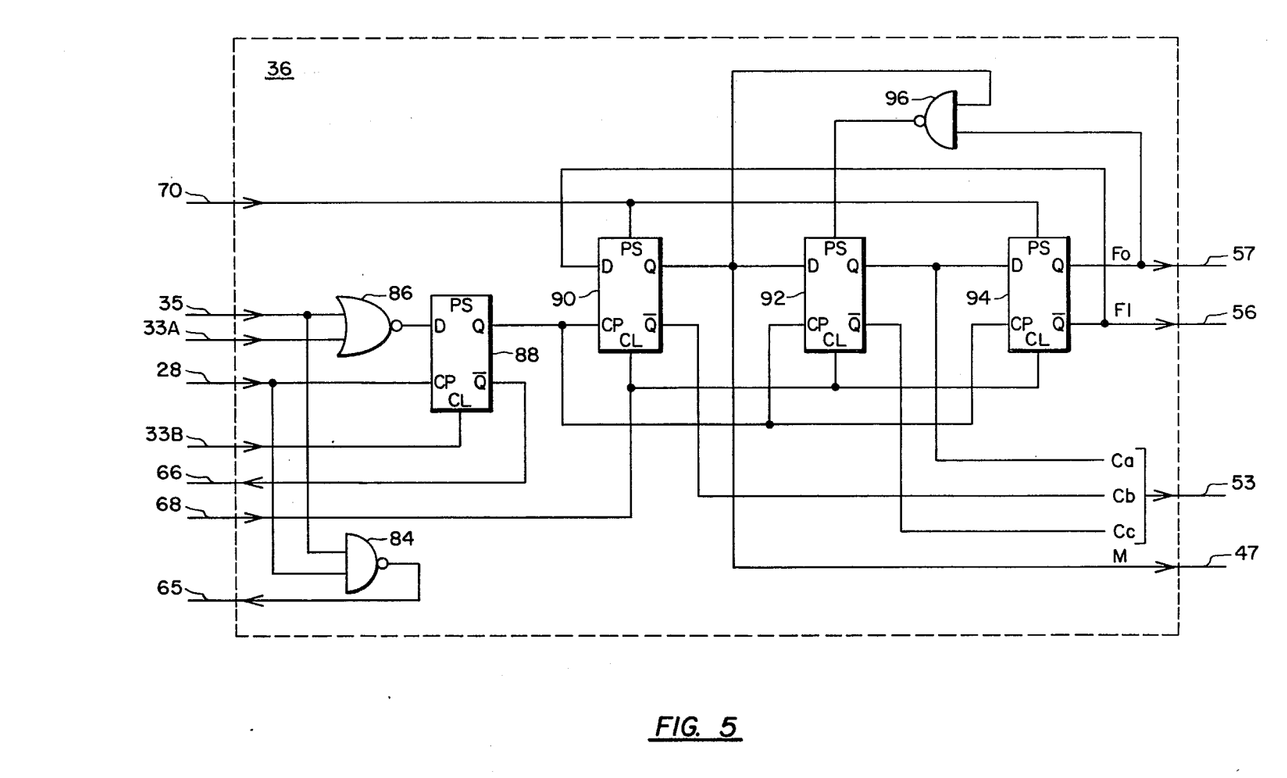
FIG. 5 is a detailed block diagram of a control bit clock generator circuit.

Referring to FIG. 4, the winking framing pulse comparison circuit consists essentially of D-type flip-flops 74 and 76 and gate 82. The timing information is generated in control bit clock generator 36 and applied via leads 56 and 57 to the clock inputs, respectively, of flip-flops 76 and 74. The received data is applied to the D-inputs of the flip-flops via path 38. The $\bar{Q}$-output of flip-flop 74 is one input to gate 82 and the Q-output of gate 76 is the second input to gate 82. Flip-flops 76 and 74 are used to store the last values of the winking framing pulses F1 and F0, respectively. If neither bit is in error, the output of gate 82 will be low, but an error on either framing pulse will force gate 82 high, which puts an error pulse on path 71 which is connected to the F error density detector 42. If the error occurrences exceed a predetermined number within a particular time period, the circuit is out of frame. In this condition, an extra count, i.e., extra extended count, is inserted for each error to offset the receive unit until it is once again aligned with the transmitted signal. This is accomplished as follows: An error in F1 or F0 is clocked into flip-flops 76 or 74, respectively, forcing gate 82 high. Since F is out of frame, the output on lead 44 is low (0), which produces a second extended count of the clock pulse generator immediately following the extended count due to the presence of a control bit. This time, however, the output on path 35 from sample counter 32 is high. Therefore, flip-flop 88 (FIG. 5) is not set, and the control bit clock generator 36 does not advance. The F0/F1 error is cleared by the end of the next T1 pulse following the second extended count by gate 84 (FIG. 5). Gate 84 normally resets flip-flop 74 and sets flip-flop 76 during alternate samples. This signal is, however, inhibited during the control pulse sample because of the high on path 35 from sample counter 32 and does not appear again until the second sample following the control bit. In this way, the error is cleared only after one more extended count is produced. If F is in frame, the extra count is inhibited.

A preview circuit is provided by flip-flop 72 and gates 78 and 80. This circuitry helps to speed the reframing process by storing the preview bit and by establishing the correct setting of the control bit generator 36. Flip-flop 72 stores the last value of the bit following the signaling bit. If F is out of frame, an error will result in a shift of the receive counters to provide an extended count. The bit stored in the flip-flop 72 is now the previous F bit, and the next F bit must be the opposite to be correct. Depending upon the outputs from gates 78 and 80, the control bit generator 36 will be reset or preset so that the proper F bit will be sought at the next F bit time. This occurs under two conditions: (1) if F0 is in error and the bit following it was a 1, gate 78 will reset the control bit generator during the strobe, and (2) if F1 is in error and the bit following it was a 0, gate 80 will preset the control bit generator during the strobe. The strobe is produced when an extended count occurs, i.e., gate 114 (FIG. 6) is low and inverter 130 is high, the extended count was not due to a control bit, and during the second half of the clock cycle when the inverter 132 (FIG. 6) was high. The strobe is inhibited by gate 67 (FIG. 3) via path 69 to gates 78 and 80 if F is in frame. By the use of this preview circuit, the reframing time is reduced.

CONTROL BIT CLOCK GENERATOR

As shown diagrammatically in FIG. 5, the control bit clock generator 36 consists essentially of an input circuit arrangement comprising gate 86, flip-flop 88, and a three-stage Johnson counter consisting of flip-flops 90, 92, 94, and gate 96. The three-stage Johnson counter provides the six outputs necessary for the six signaling bits as are used in the line format shown in FIG. 2. The Johnson counter is clocked by the setting of flip-flop 88 during each control bit. This causes one of the six outputs of the counter to go high during each control bit. These transitions are used to clock in the state of the control bit from the received data for examination. Gate 96 removes unwanted states of the counter upon initial start-up. Outputs from the various stages of the counter are assigned as shown in FIG. 5. The low-to-high transition of Q-output of flip-flop 90 is used to clock control bit M at the beginning of the frame. Then Ca and F0, the outputs of 92 and 94, respectively, of the Q-outputs. The next sequence follows the generation of the $\overline{Q}$-outputs which provide Cb, Cc and F1 from flip-flops 90, 92, and in sequence.

Each time the clock pulse generator 30 counts an extended count due to a control bit, flip-flop 88 is set for the duration of the control bit as follows: Normally, the input on lead 35 is high which forces gate 86 low to keep flip-flop 88 reset each time it is clocked by the receive clock. The sample counter is clocked at the end of T1 and when a sample preceding a control bit is due, the sample counter 32 output goes low but gate 116 (FIG. 6) has just gone high. On the clock pulse preceding the control bit, gate 116 (FIG. 6) goes low, forcing gate 86 high via path 33A so that flip-flop 88 will be set on the next clock pulse (the control bit). Since the bit following the control bit is always T1, 88 will be reset by a low at its clear input at the beginning of T1. Gate 84 is connected to receive the basic clock signal from clock recovery 27 via path 28 and the output from sample counter 32 via path 35. This produces the clear and preset pulses for flip-flops 74 and 76, respectively, (FIG. 4) of the framing circuit.

CLOCK PULSE GENERATOR

Figure 6:
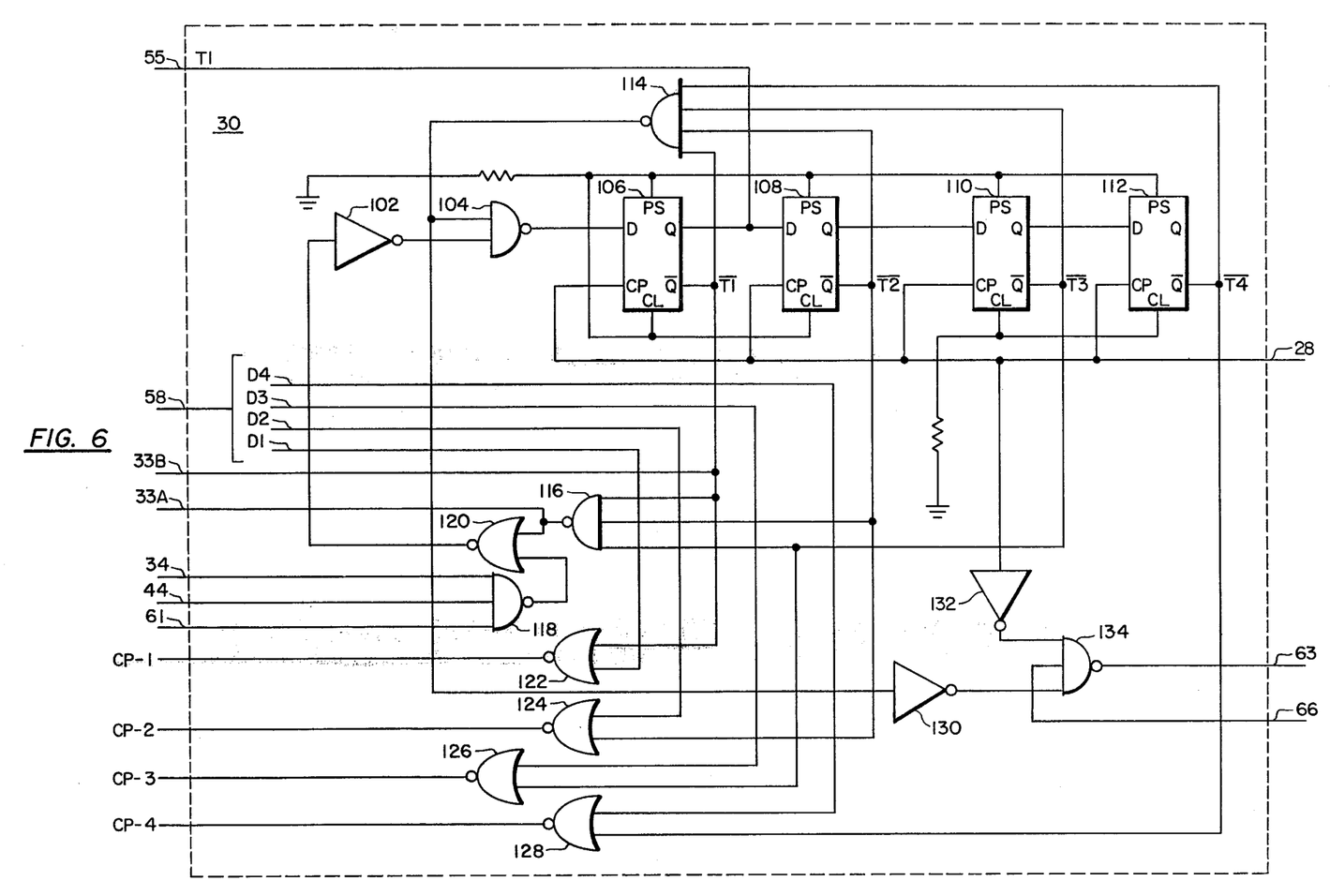
FIG. 6 is a detailed block diagram of a clodk pluse generator circuit.

A circuit which will provide the timing and control functions necessary for recovery of the four separate bit streams is shown in FIG. 6. The basic timing information is obtained by using a ring counter which consists of flip-flops 106, 108, 110, 112 as well as gates 104, 114, 116, 118, and 120 and inverter 102. Operation of the ring counter within this context may be understood by first considering that all flip-flops are initially reset. Then the $\overline{Q}$-output of each is high. Therefore, each input to gate 114 is high, and the gate 114 ouput is low, i.e., a 0. Further, gate 104 output is high so on the next clock pulse flip-flop 106 will be set, which in turn forces gate 104 low. Successive clock pulses on input path 28 shift the set condition from flip-flop 106 to 108, 108 to 110, and 110 to 112 so long as gate 104 is not inhibited. Thus, a division by four is obtained as follows: Inputs to gate 118 are all high, so the output is low 0. When the said condition reaches flip-flop 112, all inputs to gate 116 are high and its output goes low. The two low inputs to gate 120 force their output high, which is converted to a low input to gate 104 by inverter 102.

Now, if any of the inputs to gate 118 are low, its output will be high, the output of gate 120 will go low which, in turn, puts a 1 on one input of gate 104 because of the action of inverter 102. Thus, when only flip-flop 112 is set, the output of gate 114 also will be high. Thus, gate 104 is inhibited, i.e., its output is 0. For one clock pluse there is an extended count, and this is periodically timed so as to remove the signaling bits from the bit streams which are to be demultiplexed. The next clock pulse will reset all four flip-flops which forces gate 114 output high to restart the cycle. The net effect is a division by five.

As can be seen, the clock timing for the syndes unit is obtained from the ring-counter inverted outputs via gates 122, 124, 126, and 128. The second input to these gates is normally low. Therefore, whenever a given flip-flop in the counter is set, its corresponding gate goes high producing a clock pulse which is applied to the associated syndes unit. The second input to these gates is used to inhibit the clock pulses whenever destuffing is required. Control of the second input is obtained from the C circuit via path 58. As is seen in FIG. 6, path 58 has four leads each of which carry destuff information for one syndes unit. Timing for the destuff control output is supplied by the F1 pulse as shown by path 56 in FIG. 3. Further, frame identification is supplied via path 52 between the M and C circuits. This assures that the destuffing will occur following the appearance of the F1 pulse and for the appropriate syndes unit CP input.

While the invention has been described in detail with respect to a preferred embodiment, it is to be understood that the invention should not be considered to be limited to the structure described. Many variations may be constructed without departing from the scope and spirit of the invention.

What is claimed is:

1. In a digital multiplexer system wherein a plurality of lower-speed bit streams are combined in a single high-speed bit stream for transmission, the high-speed bit stream containing information bits, stuffed bits, and signaling bits, said signaling bits further including evenly spaced winking framing bits, apparatus for reframing which comprises:

means for deriving timing information from said high-speed bit stream;

framing error detection means responsive to the received high-speed bit stream and to said timing informatiion means for detecting errors in the framing pattern, said error detection means providing an error output signal for each error occurrence, within a predetermined time after the last error occurrence, only after a predetermined number of errors have occurred, said error output signals initiating a reframing cycle;

means for counting a predetermined number of bits in said high-speed bit stream and providing a first output signal in the time slot following the last bit in the predetermined count, said counting means being also responsive to error output signals of said framing error detection means, which signals cause signal outputs following said first output signal;

preview means, including means for storing the bit immediately following the framing bit, said preview means being responsive to the timing information means, the counting means, the framing detection means, and the high-speed bit stream, said preview means including means for comparing the preview bit with the next winking framing bit; and means responsive to the output of said preview means to inhibit the reframing cycle once the comparing means indicates an in-frame condition has been obtained.

2. Apparatus in accordance with claim 1 wherein said means for deriving timing information further comprises:

means for deriving a clock signal from said high-speed bit stream;

clock pulse generator means, responsive to said derived clock signal, the output signal of the counting means, and the error output signal of said framing detection means, for generating a plurality of clock pulses at the lower bit rate for demultiplexer timing, for interrupting the generator for one clock period periodically on occurrence of the first output signal of said counter means, and for extending the interruption for one clock period for each error output signal; and control bit clock generator means responsive to the derived clock means, the clock pulse generator means, and the counting means, said control bit means providing output signals at the control bit times including the evenly-spaced framing bit times.

3. Apparatus in accordance with claim 2 wherein said framing error detection means further comprises:

means for storing bits selected from the received data at the evenly-spaced winking framing bit times;

means for comparing the stored bits to determine if a framing error has occurred, said comparing means providing an error indication whenever an error in the winking framing bit occurs; and error density means responsive to the error indications of said comparing means for providing said error output signal.

4. Apparatus in accordance with claim 3 wherein said means for counting further comprises:

a counter having an output connected to said clock pulse generator means and to said control bit generator means having an input connected to count the pulses occurring in one lower bit rate output of said clock pulse generator means for providing a periodic inhibit signal at its output to compensate for the periodic occurrence of said signaling bits in the received high-speed bit stream.

5. Apparatus in accordance with claim 4 wherein said preview means further comprises:

a flip-flop having two outputs, having an input connected to receive the high-speed data, and having a clock input responsive to the timing information means whereby the data read into said flip-flop is the bit immediately following the last signaling bit in a frame;

a first gating means having a first input connected to said means for deriving timing information so as to provide timing of the output at the winking framing times, and having a second input connected to said error density detector so as to provide an inhibit signal at the output whenever said detector indicates an in-frame condition exists; and a second gating means having a first pair of inputs connected to the outputs of said flip-flop, a second pair of inputs connected to said means for storing framing bits, and a third pair of inputs connected to said first gating means.

6. In a digital multiplexer system wherein a plurality of lower-speed bit streams are combined into a single high-speed bit stream for transmission, the high-speed bit stream including information bits, stuffed bits, and signaling bits wherein said signaling bits include evenly-spaced winking framing bits, apparatus for reframing which comprises:

means for deriving a clock signal from said higher-speed bit stream;

means for counting a predetermined number of bits in said higher-speed bit stream and providing an output in the time slot following the predetermined count;

framing error detection means responsive to the received higher-speed bit stream to determine if an error has occurred in the framing pattern, said framing error detection means providing an error output signal for each framing error once a predetermined number of errors have occurred within a predetermined time;

clock pulse generator means responsive to said derived clock signal, the output signal of the counting means, and the error output signal of said framing detection means for generating a plurality of clock pulses at the lower bit rate for demultiplex timing and to interrupt the generator for one clock period periodically on occurrence of the first output signal of said counter means, and for extending the interruption for one clock period for each error output signal; and control bit clock generator means responsive to the derived clock means, the clock pulse generator means, and the counting means, said control bit clock means providing output signals at the control bit times including the evenly-spaced framing bit times; and preview means including means for storing the bit following the framing bit, said preview means being responsive to the derived clock means, the counting means, the higher-speed bit stream, and the framing means for setting the control bit clock generator means so the appropriate winking framing bit appears at the next framing bit time.

7. In a digital multiplexer in which a plurality of equal-rate, low-speed information bit streams are combined to provide a high-speed bit stream, which includes stuffed bits, said high-speed bit stream further including signaling bits wherein a signaling bit is inserted at periodic intervals, the signaling bits carrying framing and stuffed pulse locaton information in the form of multiframe identification bits (M-bits), winking framing bits (F-bits), and control bits (C-bits), a receiver timing arrangement which comprises:

means for deriving basic timing information from the high-speed bit stream;

clock pulse means dividing the output of the basic timing means into a plurality of timing signals, each having an initial rate which is 1/N of the high-speed rate, where N is the number of low-speed bit streams;

counting means responsive to the basic timing means for deriving a periodic signal at the signaling bit period, said periodic signal being applied to said clock pulse means to periodically interrupt the timing signals at the signaling bit rate; and control means responsive to the received high-speed bit stream, the basic timing means, the clock pulse means, and the counting means to derive control signals which cause an extended count to occur, following said periodic interruption, whenever an out-of-frame condition exists and an error occurs.

8. The apparatus in accordance with claim 7 wherein said clock pulse means further comprises:

a ring counter having an input from said basic timing means, said ring counter providing N pulse outputs, each having a rate of 1/N during uninterrupted operation; and gating means responsive to said control means and said counting means for interrupting said ring counter to provide extended counts.

9. The apparatus in accordance with claim 7 wherein said control means further comprises:

control bit clock means responsive to said basic timing means, said clock pulse means, and said counting means for generating a control output signal at each of the signaling bit times;

M circuit means responsive to said high-speed bit stream and said control bit clock means for providing at one output thereof frame identification;

destuffing means, including gating means, responsive to said high-speed bit stream, said output of the M circuit means, and said control bit clock means for providing inhibit signals at the appropriate information bit times, said inhibit signals inhibiting said gating means whenever said destuffing means determines that a stuffed bit is present in one of said low-speed bit streams; and a framing error detection means responsive to the output of said M circuit means, the high-speed bit stream, and outputs from the control bit clock means for providing error output signals when an out-of-frame condition exists, said error signals interrupting said ring counter.

* * * * *